(12) United States Patent
Flaxman

(10) Patent No.: US 10,374,491 B2
(45) Date of Patent: Aug. 6, 2019

(54) ELECTRIC MOTOR

(71) Applicant: QINETIQ LIMITED, Farnborough (GB)

(72) Inventor: Robert John Bonner Flaxman, Guildford (GB)

(73) Assignee: QINETIQ LIMITED, Hampshire (GB)

( * ) Notice: Subject to any disclaimer, the term of this patent is extended or adjusted under 35 U.S.C. 154(b) by 181 days.

(21) Appl. No.: 15/310,712

(22) PCT Filed: May 22, 2015

(86) PCT No.: PCT/EP2015/061440
§ 371 (c)(1),
(2) Date: Nov. 11, 2016

(87) PCT Pub. No.: WO2015/177354
PCT Pub. Date: Nov. 26, 2015

(65) Prior Publication Data
US 2017/0085157 A1 Mar. 23, 2017

(30) Foreign Application Priority Data

May 23, 2014 (GB) .................................. 1409177.1

(51) Int. Cl.
H02K 9/19 (2006.01)
H02K 9/22 (2006.01)
H02K 3/18 (2006.01)

(52) U.S. Cl.
CPC ................. H02K 9/22 (2013.01); H02K 9/19 (2013.01); H02K 3/18 (2013.01)

(58) Field of Classification Search
CPC .. H02K 9/22; H02K 9/19; H02K 5/04; H02K 3/04; H02K 3/24; H02K 9/193;
(Continued)

(56) References Cited

U.S. PATENT DOCUMENTS 4,737,752 A * 4/1988 Kriz ........................ H01J 29/76
313/11
9,819,239 B2 * 11/2017 Pal ........................ H02K 3/527
(Continued)

FOREIGN PATENT DOCUMENTS

EP 1257043 A2 11/2002
JP 2003-52142 A 2/2003
JP 2003052142 A * 2/2003

Primary Examiner — Quyen P Leung
Assistant Examiner — Leda T Pham
(74) Attorney, Agent, or Firm — Kenealy Vaidya LLP

(57) ABSTRACT

Some embodiments are directed to an electric motor that includes a stator including a plurality of circumferentially distributed drive elements for causing an electromagnetic driving force to be applied to a rotor of the electric motor in use. Each drive element includes a wire extending around a metal core to define a plurality of coils for magnetizing the metal core when current flows in the coils. At least one space exists between the metal core of each respective drive element and the coils around it. A cooling device is provided for transferring heat away from the drive elements. Each drive element further includes a heat conductor including a plurality of mutually electrically isolated metallic elements located in the or each respective space between the metal core thereof and the coils around it, for transferring heat from the coils to the cooling device.

13 Claims, 4 Drawing Sheets

(58) Field of Classification Search
CPC .. H02K 3/38; H02K 5/20; H02K 3/52; H02K 3/50; H02K 3/51
See application file for complete search history.

(56) References Cited

U.S. PATENT DOCUMENTS

2009/0058206 A1* 3/2009 Bremner ............... H02K 1/148
 310/64
2011/0215660 A1* 9/2011 Goto ...................... H02K 3/24
 310/53

* cited by examiner

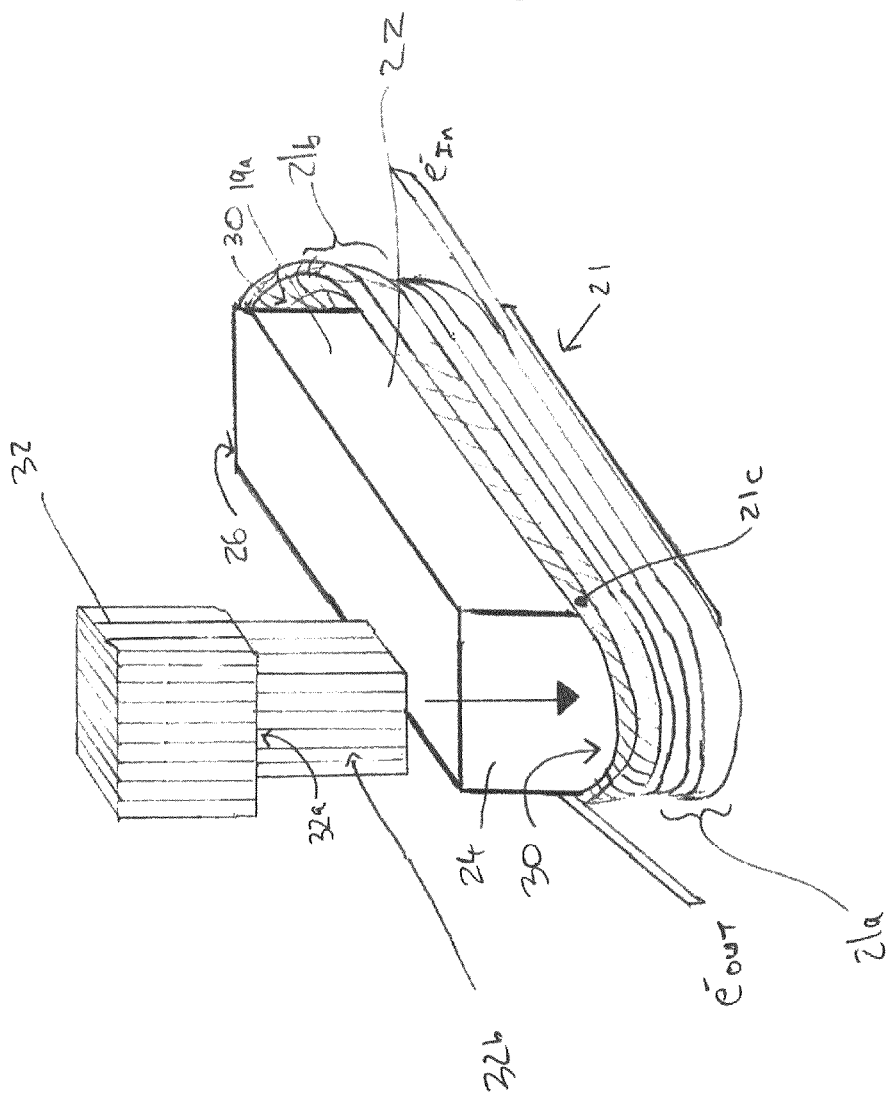

US 10,374,491 B2

ELECTRIC MOTOR

GOVERNMENT LICENSE RIGHTS

The present inventions were made with government support under Contract Number #W56HZV-11-C-0001 awarded by BAE Systems Land & Armaments L.P. The government has certain rights in the invention.

CROSS REFERENCE TO RELATED APPLICATION(S)

This application is a National Phase filing under 35 C.F.R. § 371 of and claims priority to PCT Patent Application No.: PCT/EP2015/061440, filed on May 22, 2015, which claims the priority benefit under 35 U.S.C. § 119 of British Application No.: 1409177.1, filed on May 23, 2014, the contents of which are hereby incorporated in their entireties by reference.

FIELD

This invention relates to an electric motor and in particular to a way of removing unwanted heat from a stator thereof.

BACKGROUND

An electric motor comprises a stator and a rotor. Drive elements of the stator generate varying magnetic fields which cause the rotor to spin about an axis. Such magnetic fields are generated by current flowing through coils in the drive elements. The temperature of the motor in use is related to the magnitude of current flowing through the coils. Each of the materials used within the motor will have a life rated temperature limit for continuous operation. The maximum power output of an electric motor is thus restricted by the temperature limit for one of these materials because above this temperature the service life of this material will be reduced.

SUMMARY

According to an aspect of the present invention there is provided an electric motor comprising: a stator comprising a plurality of circumferentially distributed drive elements for causing an electromagnetic driving force to be applied to a rotor of the electric motor in use, wherein each drive element comprises a wire extending around a metal core to define a plurality of coils for magnetizing the metal core when current flows in the coils, and wherein at least one space exists between the metal core of each respective drive element and the coils around it; and cooling means for transferring heat away from the drive elements; wherein each said drive element further comprises a heat conductor comprising a plurality of mutually electrically isolated metallic elements located in the or each respective space between the metal core thereof and the coils around it, for transferring heat from the coils to the cooling means.

A least one heat conductor may comprise a plurality of metal layers separated by electrically insulating adhesive.

Each metal layer may define a plane having a first edge located further from an axis about which the rotor can spin than a second, opposite, edge.

Notional lines extending between said first and second edges may extend substantially towards the axis about which the rotor can spin.

An angle between each said notional line and the axis about which the rotor can spin may be substantially 90 degrees.

The metal layers may comprise copper or aluminum.

At least one heat conductor may comprise at least one bundle of metal wires, the respective wires of each said bundle being electrically isolated from each other along their respective lengths.

The metal wires of each said bundle may be arranged such that along the length of the respective bundles, each said wire occupies substantially every position in the axial cross-section of the bundle.

The or each said bundle of metal wires may be a Litz wire.

The metal wires in each said bundle may comprise copper or aluminum.

The or each respective space between the metal core of each respective drive element and the coils around it may be defined by a curved portion of said coils which is generally curved in a plane perpendicular to the axis about which the rotor can spin.

The cooling means may comprise a water jacket or a plurality of fins.

According to another aspect of the present invention there is provided a vehicle comprising an electric motor according to any of the heretofore mentioned arrangements for propelling the vehicle.

BRIEF DESCRIPTION OF THE DRAWINGS

Embodiments of the invention will now be described by way of non-limiting example with reference to the accompanying drawings, in which:

FIG. 6 is a schematic perspective view of a heat conductor and part of a drive element according to another embodiment.

DETAILED DESCRIPTION

Figure 1:
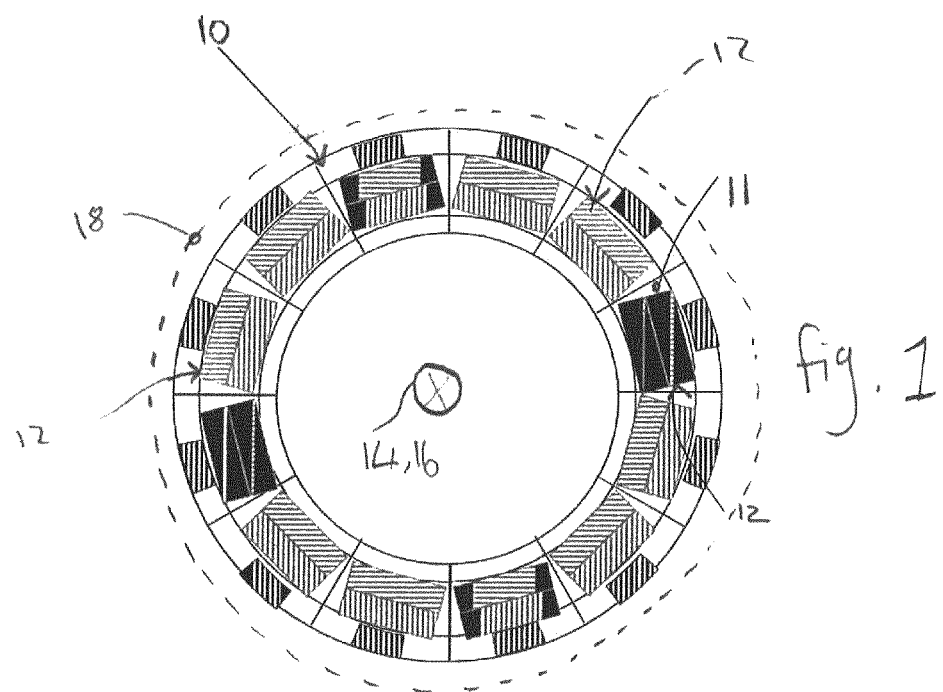
FIG. 1 is a schematic cross-sectional view through an electric motor.
Figure 2:
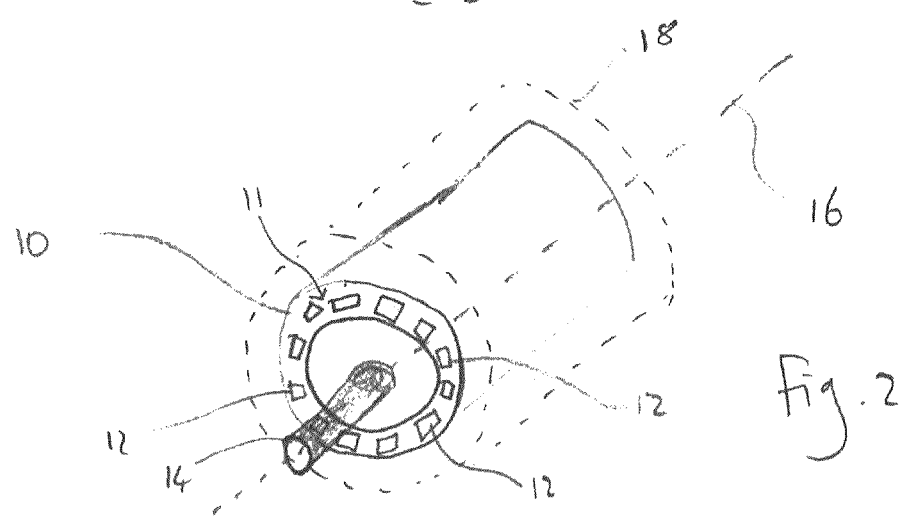
FIG. 2 is a schematic perspective view of the electric motor in FIG. 1.

An electric motor comprises a stator and a rotor, which are schematically shown in FIGS. 1 and 2. The stator 10 has a sleeve 11 in which a plurality of drive elements 12 are located. Such drive elements 12 are circumferentially distributed about the sleeve 11 and surround a rotor 14. The rotor 14 is arranged to be driven by the drive elements 12 such that it spins about an axis 16 extending along the length of the stator 10. It will be apparent to persons skilled in the art that, in use, the drive elements 12 generate varying magnetic fields for causing the rotor 14 to spin. Persons skilled in the art will also appreciate that, in use, the drive elements 12 will heat up so a cooling arrangement 18 (e.g. a water jacket or a plurality of fins for convection to air) is provided around the stator 10 to displace heat from the drive elements 12. The stator 10 is generally annular in profile.

Figure 3:
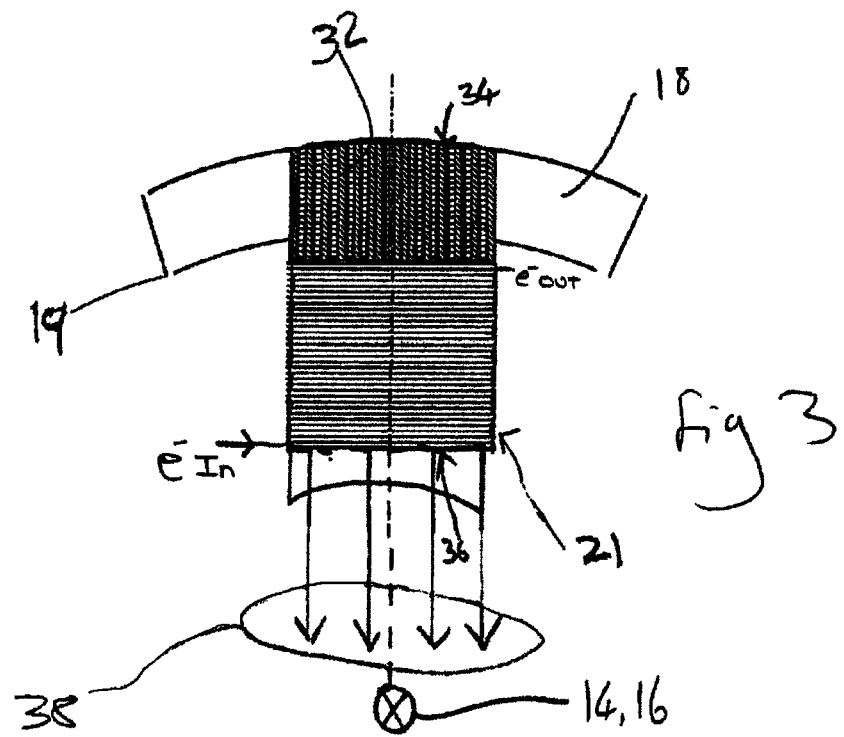
FIG. 3 is a schematic end view of a single drive element.

Details of the drive elements 12 will now be set out, one of which is schematically depicted in FIG. 3.

Figure 3A:
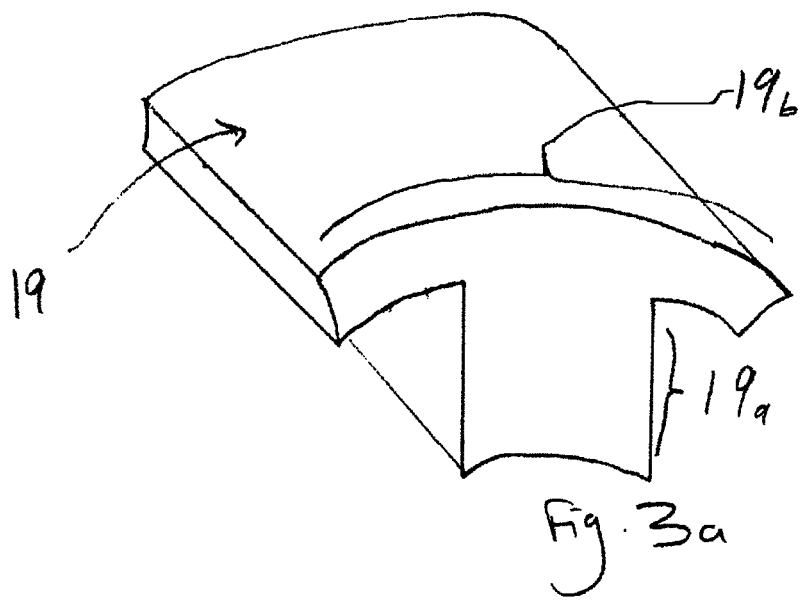
FIG. 3a is a schematic perspective view of the metal core in FIG. 3.

The illustrated drive element 12 has a metal core 19 with an electrically conductive wire 21 extending around it (e.g.

copper wire). The metal core 19 has a substantially T-shaped cross section as shown in FIG. 3*a* and includes a body section 19*a* extending outwardly from a head section 19*b*. The wire 21, which is connected to a power supply, is wrapped or coiled around the body section 19*a* of the metal core 19 in such a manner that it defines a plurality of coils there around. Thus when current flows through these coils the metal core 19 is caused to be magnetized. Magnetic fields generated in this manner are what cause a torque to be generated on the rotor 14 for causing it to spin. A suitable magnitude of magnetic field intensity fluctuations generated by the respective drive elements 12 and their specific timing in order to drive the rotor 14 will be apparent to persons skilled in the art.

The metal core 19 in FIG. 3 comprises a magnetic element and could be formed of a plurality of mutually spaced iron laminates for example, whereby adjacent laminates are separated by a layer of electrically isolating adhesive.

Figure 4:
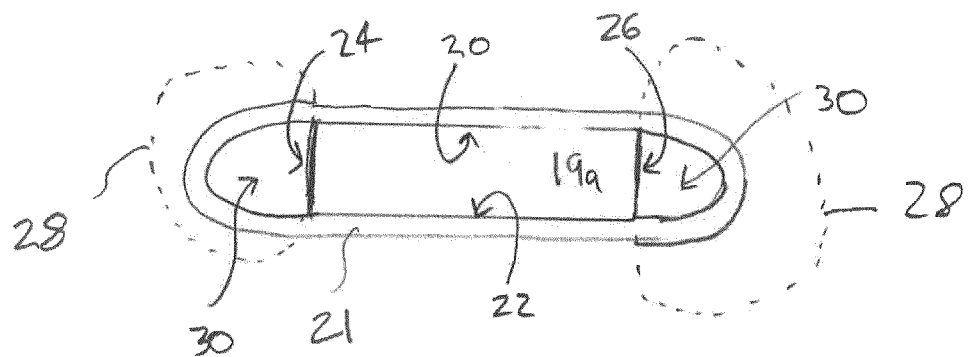
FIGS. 4 and 5 are a schematic top-side view and a schematic perspective view of part of the drive element in FIG. 3, shown without heat conductors.
Figure 5:
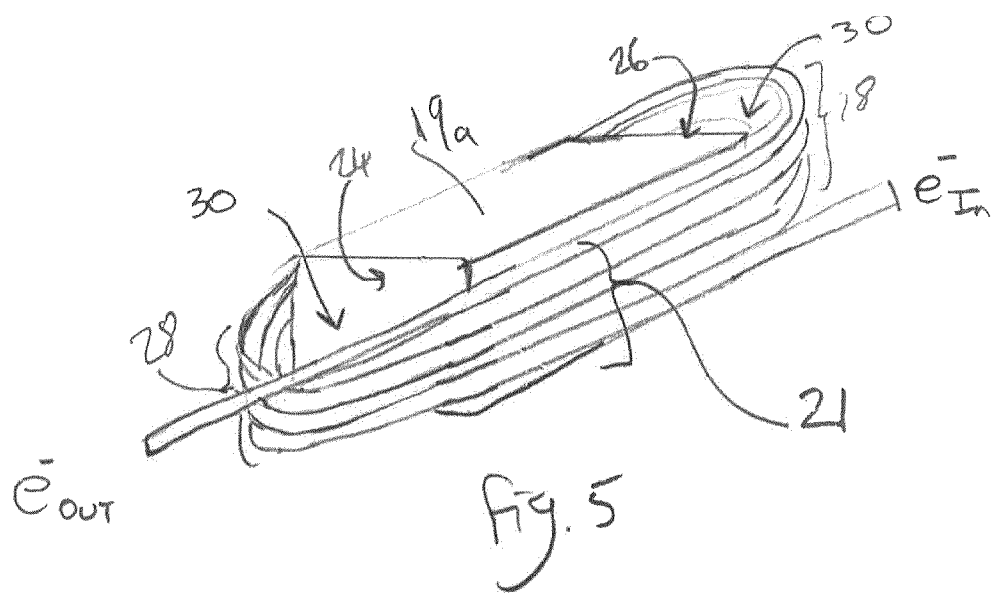

With reference to FIGS. 4 and 5, the coils of wire 21 extending around the body section 19*a* of the metal core 19 define spaces 30 adjacent opposite faces of the body section 19*a*. More specifically, the body section 19*a* of the metal core 19 has two side faces 20, 22 in addition to both front and rear faces 24, 26. When arranged in the stator 10, a notional line extending between the front and rear faces 24, 26 is substantially parallel to the axis 16 about which the rotor 14 can spin (see FIG. 2). The wire 21 coiled around the body section 19*a* of the metal core 19 extends along the two side faces 20, 22 but not the front and rear faces 24, 26. Instead a curved portion 28 of the respective coils defined by the wire 21 connects the sections of wire 21 that are in contact with the two side faces 20, 22; each such curved portion 28 being generally curved in a plane perpendicular to the axis 16 about which the rotor 14 can spin. A space 30 thus exists between the curved portions 28 of the respective coils and the front and rear faces 24, 26 of the metal core 19. The spaces 30 each generally exhibit the shape of a half-cylinder.

A heat conductor 32 (which could otherwise be referred to as a heat displacer, heat conduction element or heat displacement member) is located in each of the spaces 30 bounded by the coils around the body section 19*a* of the metal core 19. A heat conductor 32 is illustrated in this position in FIG. 3, although it is not included in FIGS. 4 and 5 for clarity purposes since it would obscure the spaces 30 depicted in these drawings. Therefore from FIG. 3 it will be apparent that the heat conductors 32 located in the respective spaces 30 are configured and arranged to conduct heat away from the curved portions 28 of wire 21 coiled around the metal core 19 and to transfer such heat to the cooling arrangement 18. This reduces the temperature of the curved portions 28 of the coils extending around the metal core 19 in use by providing a direct path for heat to flow along between the curved portions 28 of the wire 21 and the cooling arrangement 18. Without such heat conductors 32, a substantial amount of heat emanating from the curved portions 28 would instead be conducted into the lengths of wire in contact with the sides 20, 22 of the body section 19*a* before flowing through the metal core 19 itself on its way to the cooling arrangement 18, which is a less efficient manner of cooling the curved portions 28 of wire 21.

Improved cooling of the curved portions 28 of wire 21 coiled around the body section 19*a* of the metal core 19 provides that a larger current can pass through the coils before they begin to short circuit. As a result, higher intensity magnetic fields can be generated to drive the rotor 14 and so maximum power output of an electric motor can be increased.

Merely using a block or body of metal for each of the heat conductors 32 in a drive element 12 is not an optimal way of cooling the curved portions 28 of wire 21 because this would reduce overall electric motor efficiency. In particular, due to Lenz's law, Eddy currents induced in any such blocks or bodies of metal used as heat conductors 32 would act to oppose variations in magnetic fields generated for the purpose of driving the rotor 14. Such Eddy currents would also increase the temperature in the region of the curved portions 28 of wire 21.

Minimizing the effect of Eddy currents generated in the heat conductors 32 is therefore desirable.

A suitable heat conductor 32 conceived with the foregoing in mind, which is schematically illustrated in FIG. 3, is a laminated body that comprises a plurality of metal layers separated by adhesive. The metal layers comprise copper or aluminum for example and are electrically isolated from each other. Each metal layer defines a plane having a first edge 34 located further from the axis 16 about which the rotor 14 can spin than a second, opposite, edge 36. Notional lines 38 extending between the first and second edges of the respective metal layers extend substantially towards the axis 16 about which the rotor 14 can spin. As a result an angle between each such notional line 38 and the axis 16 about which the rotor 14 can spin is substantially 90 degrees. Furthermore the heat conductor 32 comprises an outer layer of electrical insulation such that it is electrically isolated from both the metal core 19 and the wire 21 coiled around it. The heat conductor 32 is configured and arranged to be in touching contact with the curved portion 28 of wire 21 it is supposed to conduct heat away from and extends radially outwardly along, or in close proximity to, the front or rear face 24, 26 of the metal core 19 as far as the cooling arrangement 18.

Using a laminated body of the type described in the foregoing paragraph as a heat conductor 32, the undesirable effects of Eddy currents already explained are reduced. In particular, if the thickness of the respective metal layers is reduced by a factor of ½ then the magnitude of Eddy currents generated in these layers in use are reduced by a factor of ¼.

Another type of suitable heat conductor 32 which addresses the adverse effects of Eddy currents already explained comprises one or more bundles of metal wire, the respective metal wires in each bundle being electrically isolated from each other along their respective lengths and comprising copper or aluminum for example. The separate strands of metal wire in each bundle are arranged (twisted, braided or woven) so that over the length of the bundle, each strand of wire occupies substantially every position in the axial cross-section of the bundle. Such a bundle of metal wires could therefore be a Litz wire, whereby the heat conductor 32 comprises one or more Litz wires capable of extending along the length of a space 30. More specifically a heat conductor 32 in accordance with this paragraph is configured and arranged to be in touching contact with the curved portion 28 of the wire 21 it is supposed to conduct heat away from and extends radially outwardly along, or in close proximity to, the front or rear face 24, 26 of the metal core 19 as far as the cooling arrangement 18.

Since magnetic fields generated by currents induced in the respective strands of a Litz wire substantially cancel each other out, the undesirable effects of Eddy currents already explained are reduced.

The two suitable types of heat conductor 32 described in the preceding four paragraphs could be used interchangeably in the stator 10. For instance all heat conductors 32 in the stator 10 could be of the same type. Alternatively one or more drive elements 12 could include one type of heat conductor 32, whereas the remaining drive elements 12 could include the other type of heat conductor 32. Furthermore, a drive element 12 could include different types of heat conductors 32 in the respective spaces 30.

An electric motor having a stator according to any variation described herein could be used to propel a vehicle whether land based or otherwise such as an armoured main battle tank, car, truck, lorry, boat, jet-ski or aircraft. Such an electric motor could also be used in various other applications unrelated to propulsion of a vehicle.

The specific manner in which the aforementioned wire 21 is coiled around the body section 19a of the metal core 19 is not essential and could be varied depending on the particular electric motor design. For instance rather than being wrapped around the body section 19a in a form of coils arranged one on top of the other (like in FIG. 5) the wire 21 could be coiled in the manner schematically depicted in FIG. 6.

In FIG. 6 like elements to those already mentioned are denoted with similar reference numerals. The wire 21 is arranged to have two coil sections. The first coil section 21a is where the wire 21 is wrapped around the body section 19a a in a series of coils arranged one on top of the other. The second coil section 21b is where the wire 21 is wrapped such that various coils are horizontally stacked around the body section 19a as shown rather than being vertically stacked on top of one another, whereby as a result respective coils collectively define the upper surface 21c of the second coil section 21b.

A heat conductor 32 suitable for use in such an embodiment has a stepped portion 32a and when the heat conductor 32 is inserted into the space 30 the underside of the stepped portion 32a contacts and extends over the upper surface 21c of the second coil section 21b. This provides that heat from a plurality of coils which the stepped portion 32a is in contact with can flow into the heat conductor 32 and towards the cooling arrangement 18. The face denoted 32b is configured such that when the heat conductor 32 is inserted into the space 30 it can be arranged to contact the inside surface of the curved portions 28 of wire 21 in a similar manner to that heretofore described.

Various possible wire coiling or winding arrangements and heat conductor shapes will be apparent to persons skilled in the art upon reading the foregoing.

It will be appreciated that whilst various aspects and embodiments of the present invention have heretofore been described, the scope of the present invention is not limited to the embodiments set out herein and instead extends to encompass all arrangements, and modifications and alterations thereto, which fall within the spirit and scope of the appended claims.

For instance although the drive elements 12 described herein with reference to the drawings are said to have two spaces 30 defined by curved portions 28 of wire 21, in some embodiments the wire 21 may be arranged such that only one space 30 is defined between a metal core 19 and the wire 21 coiled around it.

Also in some drive element embodiments the wire 21 may not be in touching contact with the metal core 19 at all, whereby the wire 21 is instead supported relative to the metal core 19. Nevertheless in such embodiments one or more heat conductors 32 could still be provided between a wire 21 and metal core 19 for conducting heat away from the wire 21 to the cooling arrangement 18.

The heat conductors 32 do not need to contact the entire inside surface of the curved portions 28 of wire 21. In view of this, persons skilled in the art will be able to envisage various possible shapes of suitable heat conductors 32. For instance part of the outer profile of a heat conductor 32 comprising a plurality of laminated metal layers may be similarly shaped to the inside surface of the curved portion 28 of wire 21 so that it can lie against it. However a heat conductor 32 comprising a plurality of Litz wires might only contact the inside surface of a curved portion 28 of wire 21 at various separate locations.

Although it has been previously mentioned that the aforementioned spaces 30 each generally exhibit the shape of a half cylinder, this is not strictly essential. At least one of a curved portion 28 of wire 21 and the front and rear faces 24, 26 could be shaped such that a space 30 instead exhibits any of a range of other shapes. Furthermore, the curved portions 28 need not necessarily be curved along their entire length and could instead comprise curved portions separated by at least one substantially straight section for instance.

The invention claimed is:

1. An electric motor, comprising:
a stator including a plurality of circumferentially distributed drive elements for causing an electromagnetic driving force to be applied to a rotor of the electric motor in use to cause the rotor to rotate about a rotational axis, wherein each drive element includes a wire extending around a metal core to define a plurality of coils for magnetizing the metal core when current flows in the coils, and wherein at least one space exists between the metal core of each respective drive element and the coils around it, the metal core defining opposing end faces that are disposed such that a notional line extending therebetween is substantially parallel to the rotational axis of the rotor, the at least one space being disposed between one of the end faces and the wire, the at least one space defining opposing open ends oriented such that a line extending therebetween is substantially perpendicular to the rotational axis of the rotor; and
a cooling structure for transferring heat away from the drive elements; wherein each drive element further includes a heat conductor that is separate from the cooling structure and that includes a plurality of mutually electrically isolated metallic elements located in the at least one space between the metal core thereof and the coils around it, for transferring heat from the coils to the cooling arrangement.

2. The electric motor of claim 1, wherein at least one heat conductor includes a plurality of metal layers separated by electrically insulating adhesive.

3. The electric motor of claim 2, wherein each metal layer defines a plane having a first edge located further from an axis about which the rotor is configured to spin than a second, opposite, edge.

4. The electric motor of claim 3, wherein notional lines extending between the first and second edges extend substantially towards the axis about which the rotor is configured to spin.

5. The electric motor of claim 4, wherein an angle between each notional line and the axis about which the rotor is configured to spin is substantially 90 degrees.

6. The electric motor of claim 2, wherein the metal layers include copper or aluminum.

7. The electric motor of claim 1, wherein at least one heat conductor includes at least one bundle of metal wires, the respective wires of each bundle being electrically isolated from each other along their respective lengths.

8. The electric motor of claim 7, wherein the metal wires of each bundle are arranged such that along the length of the respective bundles, each wire occupies substantially every position in the axial cross-section of the bundle.

9. The electric motor of claim 7, wherein the at least one bundle of metal wires is a Litz wire.

10. The electric motor of claim 7, wherein the metal wires in each bundle include copper or aluminum.

11. The electric motor of claim 1, wherein the at least one space between the metal core of each respective drive element and the coils around it is defined by a curved portion of the coils which is generally curved in a plane perpendicular to the axis about which the rotor is configured to spin.

12. The electric motor of claim 1, wherein the cooling arrangement includes a water jacket or a plurality of fins.

13. An electric motor, comprising:
a rotor;
a stator that includes circumferentially distributed drive elements configured to cause an electromagnetic driving force to be applied to the rotor during use to cause the rotor to rotate about a rotational axis, each drive element including a metal core and a wire extending around the metal core and configured to magnetize the metal core upon a flow of current, the metal core and the wire of each drive element being configured to define at least one space therebetween, the metal core defining opposing end faces that are disposed such that a notional line extending therebetween is substantially parallel to the rotational axis of the rotor, the at least one space being disposed between one of the end faces and the wire, the at least one space defining opposing open ends oriented such that a line extending therebetween is substantially perpendicular to the rotational axis of the rotor, each drive element including a heat conductor formed of multiple electrically isolated metallic elements and disposed at least partially in the at least one space, the heat conductor being disposed and configured to receive heat generated by its associated drive element upon the flow of current; and
a cooling arrangement that is separate from the heat conductor and configured to receive the heat received by the heat conductor, such that the heat conductor of each drive element transfers the heat from the drive element to the cooling arrangement.

* * * * *